United States Patent [19]

Michalko

[11] 4,210,629

[45] Jul. 1, 1980

[54] FLUE GAS TREATMENT

[75] Inventor: Edward Michalko, Hemet, Calif.

[73] Assignee: UOP Inc., Des Plaines, Ill.

[21] Appl. No.: 16,675

[22] Filed: Mar. 1, 1979

[51] Int. Cl.$^2$ .............................................. C01B 17/00
[52] U.S. Cl. ...................................... 423/242; 423/118
[58] Field of Search .......... 423/242 A, 242 R, 244 A, 423/244 R, 118, 321, 327

[56] References Cited

U.S. PATENT DOCUMENTS

| | | | |
|---|---|---|---|
| 3,764,655 | 10/1973 | Ehlers et al. | 423/321 |
| 4,100,258 | 7/1978 | Vossos et al. | 423/242 R |
| 4,134,961 | 1/1979 | Lurie | 423/242 |

FOREIGN PATENT DOCUMENTS 197711  11/1977  U.S.S.R. ................................... 423/118

Primary Examiner—O. R. Vertiz
Assistant Examiner—Gregory A. Heller
Attorney, Agent, or Firm—James R. Hoatson, Jr.; Louis A. Morris; William H. Page, II

[57] ABSTRACT

A process for removing, by absorption, sulfur dioxide from a gaseous mixture such as a flue gas by scrubbing said mixture with an aqueous scrubbing solution containing an alkaline reagent such as sodium carbonate. The solution also has dissolved in it a quantity of silica which tends to precipitate when the pH of the solution is lowered by the absorption of the sulfur dioxide. The silica precipitated in this manner tends to form rock like deposits in the scrubbing device and associated equipment. If a water soluble basic salt of aluminum, such as sodium aluminate is added to the scrubbing solution prior to its use in the process, an aluminosilicate precipitate is formed which has a minimum deleterious effect.

7 Claims, No Drawings

4,210,629

FLUE GAS TREATMENT

BACKGROUND OF THE INVENTION

1. Field of the Invention

The field of art to which the claimed invention pertains is liquid-gas absorptive separations. More specifically, the claimed invention relates to a process for the absorptive removal of sulfur dioxide from a gaseous mixture by means of scrubbing liquor.

2. Description of the Prior Art

Due to the ever increasing concern about air pollution, great efforts have been expended in recent years toward the development of processes to reduce the pollutants introduced into the atmosphere from various industrial operations. One of the most onerous of these pollutants is sulfur dioxide which is present in the stacks or flue gases from various operations. For example, $SO_2$ is a primary pollutant released into the atmosphere in the production of sulfuric acid. Also, great quantities of $SO_2$ are produced and passed to the atmosphere in the generating of power, particularly where the fuel used is high in sulfur content.

It has only been known to the art to abate sulfur dioxide pollution of the atmosphere. The so-called "wet process" is probably the most commonly used process to accomplish such abatement. In the wet process the $SO_2$ containing gas mixture is contacted or "scrubbed" with water in which is dissolved or slurried a reagent that chemically reacts with the $SO_2$, thus effecting the removal of the $SO_2$ from the gas mixture and incorporating the sulfur originally contained in the $SO_2$ onto a non-volatile compound dissolved in the scrubbing water. The sulfur is ultimately removed from the system by the discarding of the scrubbing water in which it is contained, or by removal from the water by further processing.

One reagent known for use in the scrubbing solution for the wet scrubbing process is claimed in U.S. Pat. No. 4,134,961 and comprises a mixture of sodium aluminate and sodium hydroxide with the mole ratio of sodium to aluminum of from about 1:1 to about 2:1. In the scrubbing process utilizing that reagent the $SO_2$ reacts with both the sodium hydroxide and sodium aluminate to form both sodium and aluminum sulfur containing compounds.

The reagent perhaps best known to the art for use in the scrubbing solution for the above wet process is alkali metal carbonate. The alkali metal carbonate reacts with the $SO_2$ to yield alkali metal sulfite and $CO_2$. Use of the alkali metal carbonate is particularly advantageous because solutions of that compound are commonly available as process-waste streams from industries such as metal production, textiles and paper making. The use of such streams not only cuts operating costs but also permits economies in the capital costs of wet processes because it eliminates the need for equipment to store and mix reagents obtained from other sources. Examples of prior art wet $SO_2$ scrubbing processes which utilize alkali metal carbonates are taught or claimed in U.S. Pat. Nos. 3,962,410; 3,963,825; 3,972,980; 3,984,529; and 3,987,147.

I have observed that certain inexpensive sources of soda liquor (sodium carbonate solutions) for use in wet $SO_2$ scrubbing processes contain quantities of silica which, when the pH of the liquor is lowered due to $SO_2$ absorption, precipitate and form $SiO_2$ deposits on the internals of the scrubbing apparatus. These deposits, which are essentially solid rock, interfere with the operation of the apparatus by eventually plugging the pipes and liquid circulating means which are a part of the apparatus. There is no practical way of removing these deposits.

I have found a means of minimizing the deleterious effects of the presence of silica in the scrubbing liquor of the wet $SO_2$ scrubbing process.

SUMMARY OF THE INVENTION

It is, accordingly, a broad objective of my invention to provide an improvement to a process for the absorptive removal of sulfur dioxide from a gaseous mixture by minimizing the deleterious effects of silica present in the scrubbing liquor used in the process.

In brief summary, my invention is a process for the absorptive removal of sulfur dioxide from a gaseous mixture by contacting said gaseous mixture in a scrubbing zone with a scrubbing liquor comprising an aqueous alkaline reagent solution having dissolved therein an undesirable quantity of silica contaminant. Upon the lowering of the pH of said scrubbing liquor the silica tends to precipitate from solution and form deleterious deposits which interfere with the functioning of said scrubbing zone. The improvement provided by my process comprises the addition of a water soluble basic salt of aluminum to the scrubbing liquor prior to the contacting of the liquor with the gaseous mixture thereby effecting a chemical reaction between the silica and the basic salt of aluminum to obtain an aluminosilicate compound. This compound has a minimum deleterious effect when precipitated and relatively minor interference with the functioning of the scrubbing zone.

Other objectives and embodiments of my invention encompass details about feed mixtures, scrubbing liquors, and operating conditions all of which are hereinafter disclosed in the following discussion of each of the facets of the present invention.

DESCRIPTION OF THE INVENTION

Sulfur dioxide included in a gaseous mixture, such as a flue gas, may be dissolved out of the gas in a scrubber by means of an aqueous alkaline reagent solution. The alkaline reagent used in the process of my invention is preferably alkali metal carbonate and most preferably sodium carbonate. The overall reaction that occurs when the sodium carbonate is used is:

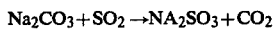

$$Na_2CO_3 + SO_2 \rightarrow NA_2SO_3 + CO_2$$

The $Na_2SO_3$ is non-volatile and highly water soluble, thereby effectively precluding the possibility of reintroduction of the sulfur into the gaseous mixture in any form.

The typical inexpensive soda liquor source comprises a waste stream or by-product of a wide variety of industrial processes, such as the process for the mining of soda ash. These sources, particularly if obtained from the process for the mining of soda ash, frequently contain an undesirable quantity of silica as a contaminant. The silica will be present in the high pH soda liquor in the form of water soluble sodium silicate having the formula: $Na_2O \times SiO_2$, where $X$ may be from 2 to 5.

The soda liquor obtained from the process for the mining of soda ash will contain about 30 wt. % sodium carbonate and about 1 wt. % silica in terms of silicon dioxide. The pH of this liquor will be about 11.5.

The typical flue gas scrubbing device comprises a vertically elongated chamber with means for introduction of the scrubbing liquor into the upper portion of the chamber and means for introduction of the flue gas into the lower portion. The liquor will be sprayed into the chamber and will flow downward through the chamber thereby coming into intimate contact with the up-flowing flue gas and thus enabling the absorption of the $SO_2$ from the flue gas into the liquor. The liquor drains out of the bottom of the chamber and is recirculated via a pump and piping for reintroduction into the top portion of the chamber. A certain amount of the circulating liquor will be removed from the system and a like amount of fresh liquor will be added to maintain the necessary minimum concentration of alkaline reagent in the liquor and a maximum concentration of sulfur compounds.

As the $SO_2$ is absorbed in the liquor, its pH will fall because of the consumption of the alkaline reagent. For example, when the liquor comprises the above mentioned soda liquor obtained from the process for mining soda ash, the pH will be allowed to fall from the initial 11.5 to preferably not less than about 7.0 at which time a portion of the liquor is replaced with fresh liquor to replenish the alkaline reagent and raise the pH of the liquor. The lowering of the pH, however, will also cause precipitation of the silica in the liquor in the form of $SiO_2$. This $SiO_2$ precipitate forms the aforementioned deleterious rock-like deposits on the internals of the scrubber and in the piping and associated equipment servicing the scrubber.

I have found that when a basic salt of aluminum, preferably sodium aluminate, is added to a silica containing scrubbing liquor prior to the liquor being used for $SO_2$ scrubbing, $SiO_2$ will not be precipitated during the scrubbing operation and the rock-like deposits will not be formed. Instead, a gelatinous aluminosilicate is precipitated, which, when compared to $SiO_2$, is almost completely innocuous. The aluminosilicate does not tend to form deposits, but largely remains in a colloidal suspension that has no effect on the scrubbing operation. The small amount of aluminosilicate deposits that do form adhere very loosely and are easily flushed from the system, particularly when the silicon to aluminum mole ratio falls within a preferred range of from about 8.0 to about 1.0.

It is essential that the aluminum salt used be a basic salt. If an acid salt of aluminum were used, such as aluminum sulfate, there would be at least one undesirable preliminary side reaction comprising a neutralization reaction between the acid salt and alkaline reagent in the scrubbing liquor. That reaction would consume a portion of the alkaline reagent, which would render that portion unavailable for absorption of sulfur dioxide. The products of this side reaction could also create problems, such as physical interference with the scrubbing operation or a requirement for additional processing.

The examples shown below are intended to further illustrate the process of this invention and are not to be construed as unduly limiting the scope and spirit of said process.

EXAMPLE I

This example presents the results of a study made of the effects of adding sodium aluminate to a soda liquor containing a quantity of silica. The concentration of sodium carbonate in the soda liquor was 30 wt. % and the concentration of silica was 4100 parts per million by weight (ppm) in terms of elemental silicon.

For a first test, a mixture was prepared by adding sufficient water, and an aliquot of dissolved sodium aluminate (65 wt. % sodium aluminate), to the above soda liquor to obtain a mixture having a silicon content of 2730 ppm. and a mole ratio of silicon to aluminum of 1:1.

The mixture, while held at a temperature of about 50° C., was gently stirred on a stir plate. A milky precipitate was observed in the mixture and the following data was obtained from chemical analysis of the supernatant liquid obtained after centrifuging the mixture:

| Time/Hrs. (from mixture formation) | ppm, Si In Solution | % Si Precipitate |
|---|---|---|
| 1 | 21 | 99.2 |
| 6 | 37 | 98.6 |
| 22 | 63 | 97.7 |

For a second test the same procedure as for the first test was followed and the same qauantitative amounts of the various constituents in the mixture were used except that the quantity of sodium aluminate added was sufficient to establish a mole ratio of silicon to aluminum in the mixture of 2:1. Again, a milky white precipitate was observed and the following data was obtained:

| Time/Hrs. (from mixture formation) | ppm, Si In Solution | % Si Precipitate |
|---|---|---|
| 1 | 135 | 95.1 |
| 2 | 138 | 94.9 |
| 4 | 142 | 94.8 |
| 6 | 142 | 94.8 |

It is clear from the above data that the sodium aluminate reacts with the silica and substantially removes it from solution. The above data also illustrates that over extended periods of time the silica does not return to the solution in any significant amount.

EXAMPLE II

This example presents the results of the practice of the present invention on a laboratory scale $SO_2$ scrubber.

The scrubber vessel comprised a 1000 ml glass flask with a bottom drain fitting. Scrubbing liquor passed through the drain fitting and flowed into tubing connecting the drain fitting to the inlet of a ½ HP seamless magnetic centrifugal pump. The pump recirculated the liquor via tubing through a stopper in the neck of the flask with the liquor being discharged downward in the neck of the flask. Between the pump discharge and the flask were provisions for external heating of the tubing and withdrawal of circulating liquor. Fresh soda liquor, either treated or untreated with sodium aluminate, was metered through a rotameter and pumped into the system at a point in the tubing between the flask and the inlet of the circulating pump, and a like quantity of circulating liquor was removed via the above mentioned withdrawal provision.

The $SO_2$ and air were each metered through rotameters and blended into a tube which passed through the stopper in the flask and extended down into the flask to discharge through a sparger near the bottom of the flask. The gaseous mixture would thus flow upward through the flask and come into contact with the scrubbing liquor flowing downwardly through the flask. The portion of the gaseous mixture not absorbed was vented out of the flask through an opening in the stopper. All tubing used in the scrubber system was 10 mm and ID glass.

To obtain experimental data, four scrubbing liquors were prepared. The first scrubbing liquor was the control sample and comprised the soda liquor of Example I diluted with a sufficient quantity of water to obtain a silicon concentration of 3200 ppm. The other three scrubbing liquors were the same as the first scrubbing liquor, except different amounts of aqueous sodium aluminate solution were added to each to obtain second, third and fourth sample scrubbing liquors having silicon to aluminum mole ratios of 2.0, 5.6 and 11.2, respectively.

Four test runs were made on the above scrubber system, each of which utilized a different one of the above sample scrubbing liquors. The operating conditions of the scrubber system during all of the test runs was as follows:

| | |
|---|---|
| $SO_2$ rate | 0.27 cubic ft./hr. |
| Air rate | 0.5 to 1 cubic ft./hr. |
| Recirculating scrubbing liquor temperature | 53 ± 30° C. |
| Velocity of recirculating scrubbing liquor in tubing | 2 to 3 ft./sec. |

Following are the results of the test runs:

| Run & Sample No. | Si/Al | Ph Range | Observations |
|---|---|---|---|
| 1 | — | 7.4 to 7.6 | Hard unremovable, stone like deposits in scrubber system. |
| 2 | 2.0 | 7.0 to 7.5 | Clean tubes with loose gelatinous circulating material. |
| 3 | 5.6 | 7.4 to 7.6 | Gelatinous deposits removable with moderate force of circulating water. |
| 4 | 11.2 | 7.3 to 8.9 | Gelatinous deposits removable with difficulty requiring high force of circulating water. |

The advantages of the present invention are readily apparent from the above data. Without pre-treatment with sodium aluminate the use of silica-containing scrubbing liquor results in a buildup of rock or stone in the system that would eventually render it inoperative. The gelatinous precipitate formed by the addition of sodium aluminate is innocous up to an estimated Si to Al ratio of about 8.0. Above that value the precipitate becomes too firmly deposited in the scrubber system to be removed by practical means, such as flushing with water.

I claim as my invention:

1. In a process for the absorptive removal of sulfur dioxide from a gaseous mixture by contacting said gaseous mixture in a scrubbing zone with a scrubbing liquor comprising an aqueous alkaline carbonate reagent solution having dissolved therein an undesirable quantity of silica contaminant which, upon the lowering of the pH of said scrubbing liquor tends to precipitate from solution and form deleterious deposits which interfere with the functioning of said scrubbing zone, the improvement which comprises the prior addition of a water soluble basic salt of aluminum to said scrubbing liquor before the contacting of said liquor with said gaseous mixture thereby effecting a chemical reaction between said silica and said basic salt of aluminum to obtain an aluminosilicate compound having a minimum deleterious effect when precipitated and relatively minor interference with the functioning of said scrubbing zone.

2. The process of claim 1 further characterized in that said gaseous mixture comprises a flue gas.

3. The process of claim 1 further characterized in that said alkaline reagent comprises sodium carbonate.

4. The process of claim 3 further characterized in that said scrubbing liquor comprises an aqueous solution of about 30 wt. % sodium carbonate and about 1 wt. % silica in terms of silicon dioxide.

5. The process of claim 4 further characterized in that the pH of said scrubbing liquor may range from about 11.5 to about 7.0 during said contacting with said gaseous mixture.

6. The process of claim 1 further characterized in that said basic salt of aluminum comprises sodium aluminate.

7. The process of claim 1 further characterized in that the quantity of said basic salt of aluminum added to said scrubbing liquor is such that the mole ratio of silica contained in said scrubbing liquor to aluminum contained in said added basic salt of aluminum is from about 8.0 to about 1.0.

* * * * *